April 3, 1962

J. E. OTT ETAL 3,027,788

HOSE CLAMPING MACHINE

Filed Jan. 26, 1959

Inventors
John E'kern Ott,
John J. Koza
and Raymond F. Novy
By Pringley, Baird, Clayton, Miller & Vogel
Attys.

April 3, 1962  J. E. OTT ETAL  3,027,788
HOSE CLAMPING MACHINE
Filed Jan. 26, 1959  5 Sheets-Sheet 2

Inventors
John Ekern Ott,
John J. Koza
and Raymond F. Novy
By Pranyley, Baird, Clayton, Miller + Vogel
Attys.

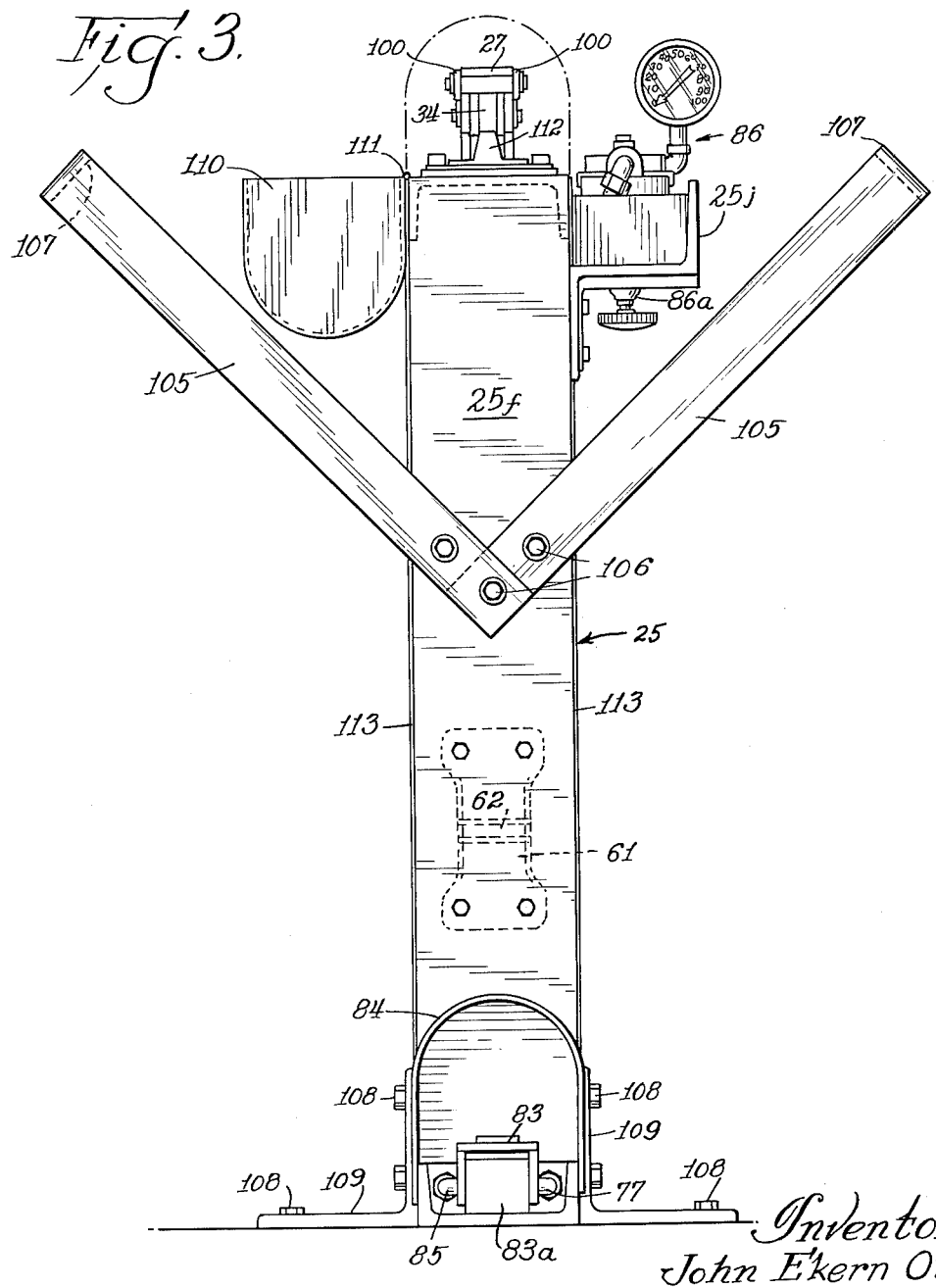

April 3, 1962

J. E. OTT ETAL 3,027,788

HOSE CLAMPING MACHINE

Filed Jan. 26, 1959

Inventors
John Ekern Ott,
John J. Koza
and Raymond F. Novy
By Prangley, Baird, Clayton, Miller & Vogel
Attys.

April 3, 1962 J. E. OTT ETAL 3,027,788
HOSE CLAMPING MACHINE
Filed Jan. 26, 1959 5 Sheets-Sheet 5
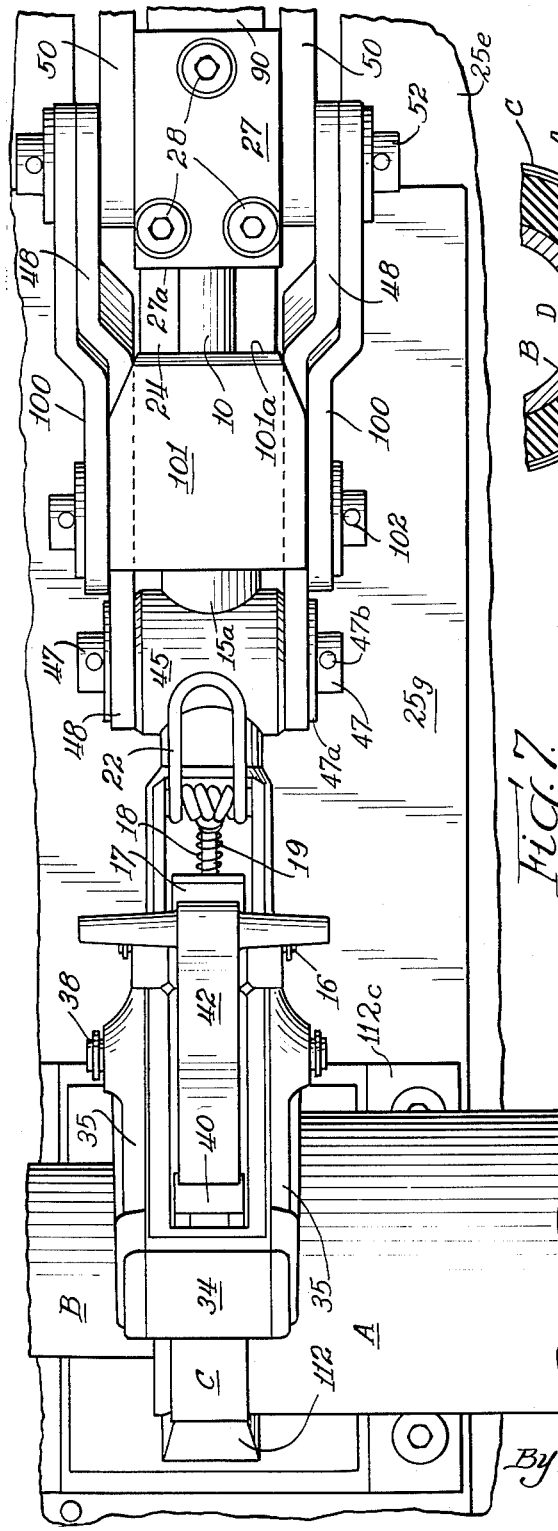
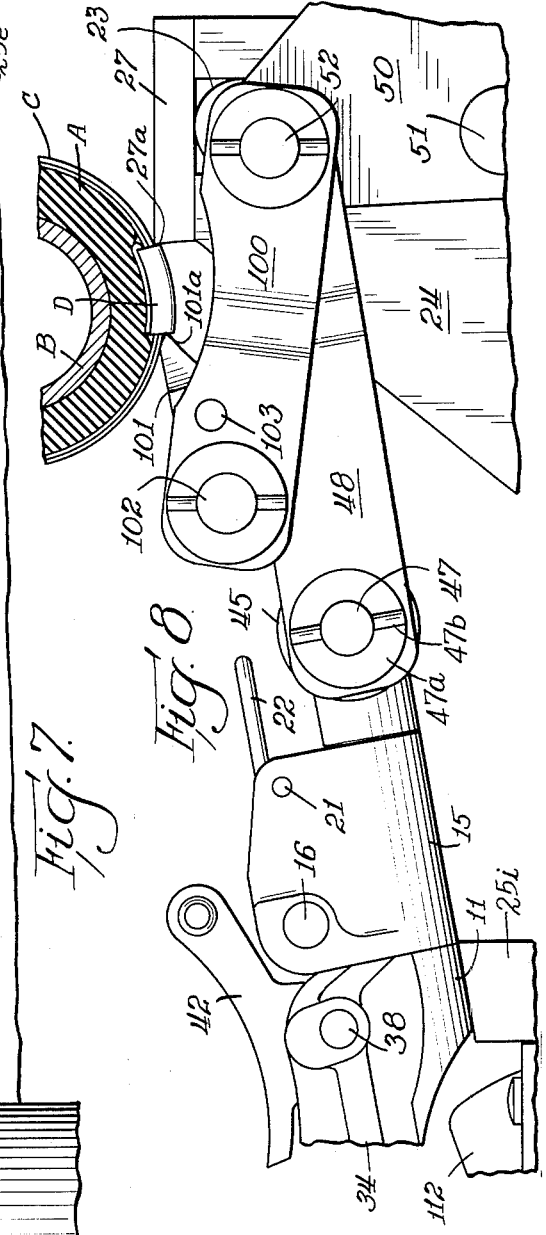
Inventors
John Ekern Ott,
John J. Koza
and Raymond F. Novy
By Pringley, Baird, Clayton, Miller & Vogel
Att'ys.

United States Patent Office 3,027,788
Patented Apr. 3, 1962

3,027,788
HOSE CLAMPING MACHINE
John Ekern Ott, Hinsdale, John J. Koza, Berwyn, and Raymond F. Novy, Brookfield, Ill., assignors to Punch-Lok Company, Chicago, Ill., a partnership of Illinois
Filed Jan. 26, 1959, Ser. No. 789,066
2 Claims. (Cl. 81—9.3)

The present invention relates to tools for pulling and tensioning metal bands and locking them in their tensioned condition, and more particularly to a highly improved power-operated machine that is especially useful in, although not limited to, the securing of hose clamps about rubber hoses or other conduits and the like.

Efforts have heretofore been made to produce power-operated machines for tensioning and locking metal bands about various objects, and successful machines of this kind have heretofore been constructed for the purpose of tightening and locking hose clamps about hoses. Certain of such power-operated machines, for example, will be found illustrated and described in the copending patent application of John Ekern Ott for Punch Lock Forming Machine, Serial No. 253,850, filed October 30, 1951, now U.S. Patent No. 2,913,939 and in the U.S. patent to Ellis E. Hewitt et al. for Hose Clamp Applying Machine, No. 2,729,994. The machines shown in the patents just mentioned are quite successful, but they are relatively large and expensive and for this reason they find use primarily only in those industries where the machines can be kept running most of the day and where hundreds, and perhaps even thousands, of hose clamps are to be applied each day. There is, therefore, a serious need for a much more simple and far less expensive power-operated hose clamp applying machine, and the machine of the present invention has been created in the fulfillment of that need. The present machine, in contrast to those disclosed in the above-mentioned patents is relatively very inexpensive and simple in construction and requires only a minimum of maintenance. As a result, the present machine finds particularly wide use not only in those industries that require the application of many hose clamps every day, but also in those industries wherein the use of hose clamps is more or less sporadic or cyclic and not necessarily constant or in great volume. The present machine, furthermore, is extremely simple to operate and requires no special training or skills on the part of the operator.

In addition to fulfilling all of the above objectives, it is a further object of the present invention to provide a power-operated band or hose clamp applying machine which, by simple and inexpensive mechanism, will uniformly tension each hose clamp to a predetermined tension that may easily be varied or selectively changed at will without the necessity of replacing control parts. Still another object of the invention is to provide a machine of this character which also has embodied therein simple and inexpensive power-operated means for clipping or removing bands or hose clamps from hoses and the like. Yet another object of the invention is to provide a machine of the kind stated which is suitable for applying bands and hose clamps to objects of various sizes. Still another object of the invention is to provide in the machine various control and interlock features which protect the machine from damage during its operation. Another object of the invention is to provide an improved power-operated machine having all of the features indicated above, and which is also rugged in construction, reliable, and safe in operation.

These and other objects and advantages of the present invention will be understood from the following description of a preferred embodiment thereof, wherein the invention, for purposes of illustration and better understanding, has been shown embodied in a machine constructed specifically for the purpose of applying and removing hose clamps from hoses. Although reference will thus be made hereinafter primarily only to a hose clamp applying machine, and although the present application is so entitled, it will readily be understood that the present invention may be embodied in machines for applying and tensioning clamps and bands about objects other than hoses.

In the accompanying drawings:

FIG. 3 is a front elevational view of the machine, with the cover therefor shown by full lines in its open position and by broken lines in its closed position wherein it covers the working parts at the top of the machine;

FIG. 7 is an enlarged top plan view of the top of the machine; and

FIG. 8 is an enlarged elevational side view of the operating parts at the top of the machine showing the position which they may occupy when the hose and hose clamp shown in FIGS. 1 and 4 to 7 have been removed from the machine and when the machine is about to be operated to remove a hose clamp from a hose.

For purposes of illustration, the hose clamp shown as being acted upon by the present machine is a clamp of the general kind shown and fully described in United States Letters Patent to C. H. McKee, No. 2,312,575. The clamp, therefore, need not be described in great detail here. It will suffice to point out that in the present drawings the letter A designates a hose, which may be of rubber or the like, and the letter B designates a metal nipple or hose coupling inserted into the hose, the two being secured together by means of the clamp. The clamp itself is comprised of a length of pliable metal band, one portion of the band being wound on itself to form a two-ply ring C. The plies or coils of the ring C include outer and inner lapped end portions with the intermediate ply or coil lying between them. The clamp also includes a band-like collar D which transversely embraces the lapped end portions and the intermediate coil. The lapped end of the inner coil is bent backwardly on itself to form a hook C' (FIGS. 5 and 6) that anchors the inner coil to the inner limb of the collar D which it embraces, and continuous with the outer coil there is a straight tangential extension or "tailpiece" E that passes under the outer limb of the collar and is engaged by the tensioning and punching apparatus of the present invention in order that the band may be pulled so as to reduce the diameter of the ring C and tighten the ring about the hose A. This, of course, will clamp the hose onto the nipple B, such connections being widely used in such places, for example, as the railroad industry and other industries where it is necessary to clamp a hose onto a metal member of one kind or another.

Figure 1:
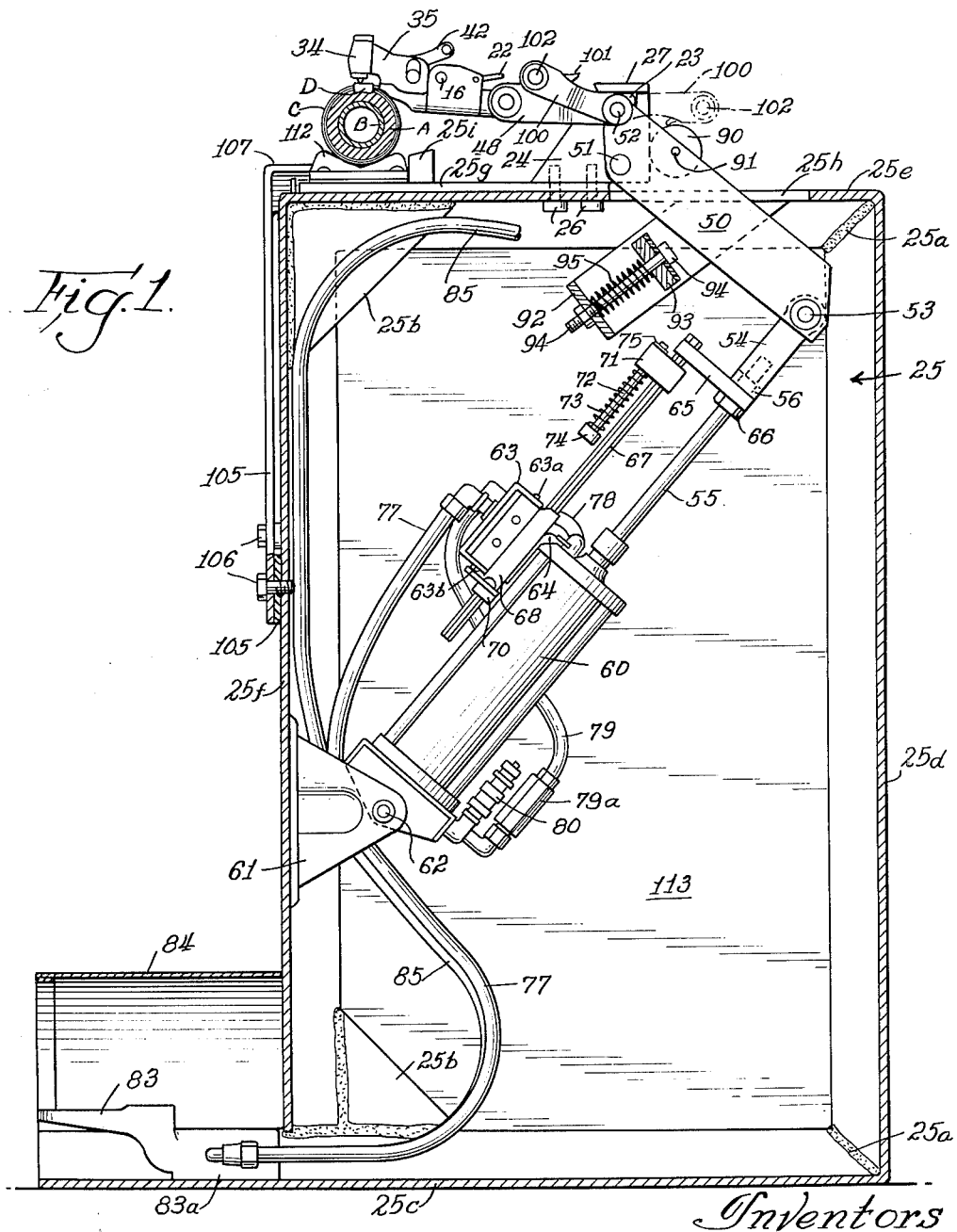
FIG. 1 is an elevational side view of a power-operated hose clamp applying machine embodying the present invention, one side wall of the housing being broken away in order to reveal the interior thereof.

The machine itself is comprised of a rigid upstanding base assembly 25, the frame for which is preferably of rectangular form made up of bottom, rear, top and front U-shaped channel members 25c, 25d, 25e and 25f, respectively. (See FIG. 1.) The rear member 25d may be secured at its lower end to the rear end of the bottom member 25c, as by welding at 25a, and may be secured in a similar manner to the rear end of the top channel member 25e. Similarly, the front channel member 25f may be welded at its upper end to the front end of the top member 25e, with the joint reinforced, if desired, by side gussets 25b. The lower end of the front channel member 25f terminates at the level of the upwardly directed flanges of the lower channel member 25c and is secured to these flanges as by welding and by the use of additional gussets 25b, as best seen in FIG. 1. The forward end of the lower or bottom channel member 25c extends forwardly of the front member 25f and has mounted therein, as by screws (not shown), a three-way air valve 83a of any suitable construction operated by a foot pedal 83, over which there may be mounted a protective hood 84.

The channel members 25c, 25d, 25e and 25f form a rigid frame for the base assembly 25, the open sides of which are preferably closed by a pair of side plates 113 which may be removably secured to the inwardly directed flanges of the channel members, as by screws (not shown). The entire assembly may be secured in upright position upon a floor by means of L-shaped brackets 109, the respective legs of which may be attached to the floor and to the inwardly turned flanges of the front and rear channel-shaped frame members by bolts or screws 108 (FIG. 3).

Figure 2:
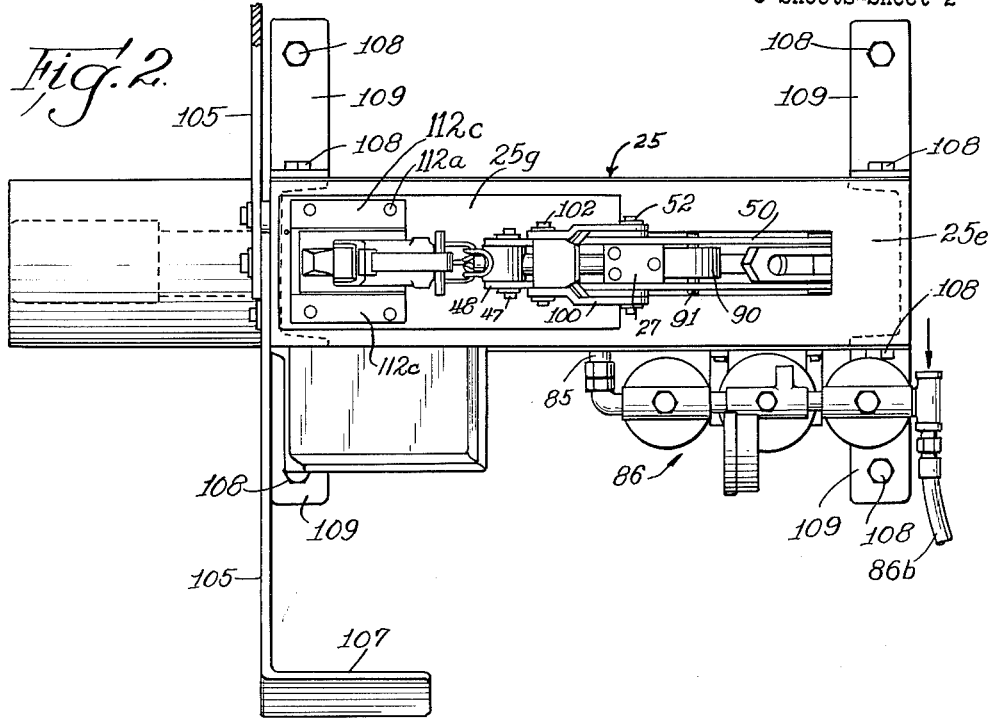
FIG. 2 is a top plan view of the machine, but with a cover for the machine removed therefrom for simplicity of illustration.

A tool base plate 25g, which is generally rectangular in shape, is welded or otherwise secured upon the top surface of the upper frame member 25e toward its forward end, and a V-shaped work receiving block 112 is slidably mounted upon the front portion of this base plate 25g, adjacent its forward end, between a pair of way members or gibs 112c secured in place by cap screws 112a (FIGS. 2 and 3). It will be observed that the work receiving block 112 is shaped so as to receive and hold a hose or other item that is to have a metal band or hose clamp secured thereabout. Although not essential, it is preferred that a shock pad 112b, of nylon or the like, be disposed between the bottom of the block 112 and the upper surface of the tool base plate 25g so as to absorb the shock that occurs when the collar D and the lapped ends of the band C therein are punched, as hereinafter described, in order to secure the tightened coils in their tensioned condition.

It will be seen, particularly from FIG. 7, that when a hose clamp is being applied to a hose A by the present machine, the coils C of the clamp are located on the work receiving block 112. The hose will thus extend laterally in one direction or the other with respect to the block and, in order more conveniently to support or hold the hose in this position, the preferred form of the machine has secured upon the front frame member 25f thereof a pair of upwardly and outwardly extending hose supporting arms 105 that may be attached to the front frame member by bolts 106 (FIG. 3). The upper end of each of these arms has a rearwardly directed arm 107 formed thereon across either one of which the hose A may be laid while a clamp is being applied to the hose.

Figure 5:
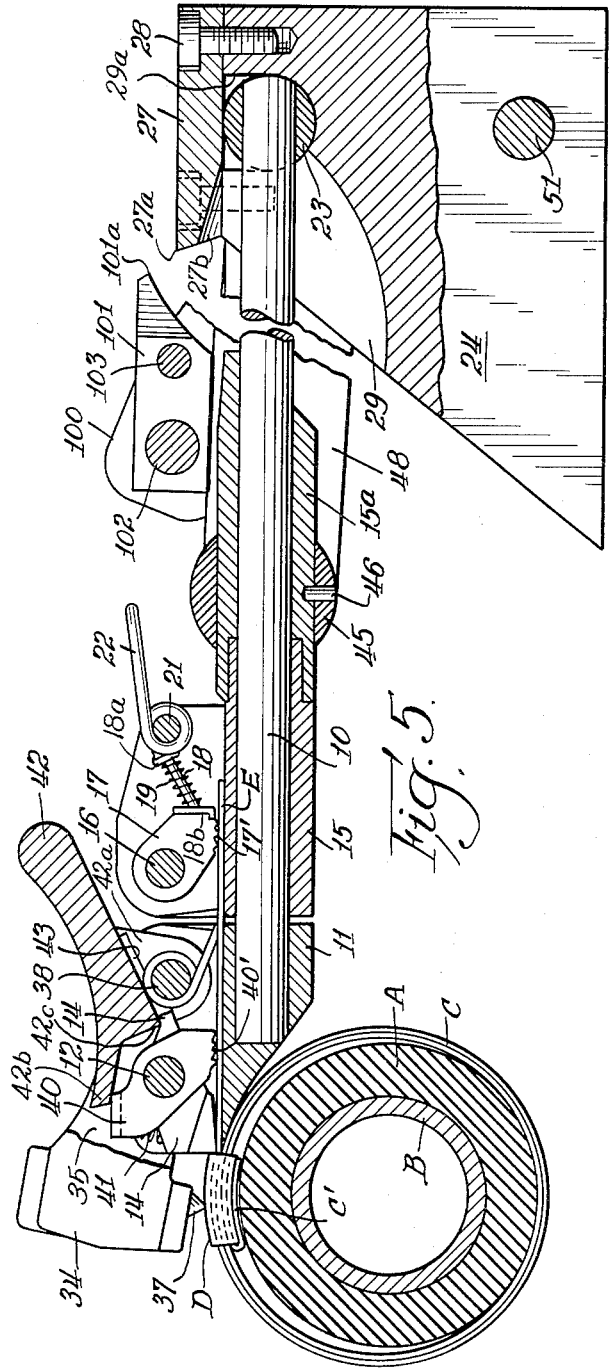
FIG. 5 is a greatly enlarged elevational view, mostly in longitudinal cross section, of the band or clamp tensioning apparatus at the top of the machine, the parts being shown in the position which they occupy just as the machine is about to make a tensioning stroke and when the remaining parts of the machine are in the positions illustrated in FIG. 1.

An upstanding tool pivot block 24 is secured upon the upper surface of the tool base plate 25g, adjacent its rear end, as by cap screws 26 that extend upwardly through the upper frame member 25e and through the tool base plate and are threaded into the bottom of the pivot block. This pivot block is of the shape best seen in FIG. 5 and its upper portion has formed therein a T-shaped slot having a forwardly extending leg 29 and a transversely extending leg 29a. As shown in FIG. 5, the bottom of the transversely extending leg 29a of the T-shaped slot is rounded to provide a bearing surface, and the floor of the forwardly extending leg 29 of the slot is milled or otherwise formed so that it slopes forwardly and downwardly. The transversely extending leg 29a of the T-shaped slot pivotally receives a short cylindrical stub shaft 23 which has fixed therein a rod 10 that projects forwardly through the leg 29 of the slot, the stub shaft 23 being pivotally retained by a cap plate 27 secured to the top of the pivot block 24, as by button-head screws 28. The forward face of this cap plate extends upwardly at an angle of about 75° with respect to the horizontal so that the forward edge 27a of the plate will serve as a cutting or severing edge for purposes that will be later explained. The underside of the cap plate adjacent its front is milled out in the central area of the plate, as at 27b (FIG. 5), so as to permit the forwardly extending rod 10 to swing to a position above the horizontal as it is swung up and down in a vertical plane within the leg 29 of the T-shaped slot in the pivot block 24. This vertical swinging movement of the rod 10 about the geometric axis of the stub shaft 23, it will later be apparent, permits the present machine to tighten bands or clamps about hoses of various diameters.

The rod 10 extends forwardly to a position adjacent the work receiving block 112 and has mounted thereon band receiving and gripping means which, in certain respects, resemble certain corresponding portions of a band pulling and punching tool shown and described in the U.S. patent to Elmer J. Govanus, No. 2,312,400. More specifically, a forging 11 is tightly driven and welded onto the forward end of the rod 10. The upper portion of this forging is of channel shape in cross section, and the flat top surface of the lower solid portion forms, in part, a slideway for the extension or "tailpiece" E of the hose clamp which is inserted into the machine. Pivoted on a cross pin 12 mounted in and between the side walls of the channel forging 11 there is a yoke-shaped holding dog 40 having teeth 40' formed on the lower ends of its two legs which engage the extension E of the hose clamp when the extension is received in the machine. Also pivoted on the pin 12 between the legs of the yoke-shaped holding dog 40, there is a pusher nose 14, the lower front edge of which abuts against the upper limb of the collar D of the hose clamp when the band is being tensioned, as will be later explained.

Slidably mounted upon the rod 10, to the rear of the forging 11, there is a puller housing 15 the upper portion of which is also longitudinally channeled for the purpose of receiving the extension E of the coils C of the hose clamp. Within the channel of this housing 15 a pulling dog 17 is pivotally mounted on a cross pin 16, the dog having teeth 17' on its lower surface for gripping the extension E of the clamp. The dog 17 is normally held in its working position (see FIGS. 5 and 6) by a thrust spring 18 that encircles a short lever arm 19, the lower end of which is articulated in the dog and the upper end of which is coiled around a fulcrum pin 21 located in the upper portion of the puller housing 15, and continuous with the coils there is a rearwardly extending loop-shaped lever arm 22. The spring 18 is confined between an upper washer 18a and a plate 18b (FIG. 5), the latter of which bears against the dog 17 and through which the arm 19 extends. It will thus be understood that, by depressing the loop-shaped lever 22, the pulling dog 17 may be raised out of contact with the extension or "tailpiece" E of the hose clamp.

A lever 42 is provided on the upper part of the forging 11 for raising the holding dog 40 and the pusher nose 14. This lever is generally T-shaped (see FIG. 7) to facilitate grasping the same, and on the underside of the lever there are a pair of downwardly extending ears 42a (FIG. 5) which are pivotally received upon a pin 38 that is mounted across the channeled upper portion of the forging 11, thereby permitting the lever to be pivoted in a counter-clockwise direction from the position thereof shown in FIGS. 5 and 6. The lever 42 is biased lightly in this counter-clockwise direction by a spring 43, and the extremity 42b of the lever normally rests lightly upon the upper limb of the yoke-like holding dog 40. A stronger spring 41 is disposed between the underside of this limb and the top of the pusher nose 14 so that the force of the spring 43 is overcome and the pusher nose is biased in the counter-clockwise direction and the yoke-shaped dog 40 is biased in the clockwise direction (as viewed in FIGS. 5 and 6). The extremity 42b of the lever 42, however, rests on the top of the dog 40, as previously stated, and the underside of the lever is provided with a depending lug 42c that engages the rear extremity or tail of the pusher nose 14. Thus, it will be understood that, by raising the lever 42 in the counter-clockwise direction, the pusher nose 14 and the lower end of the holding dog 40 will both be raised to facilitate insertion of the extension E of the hose clamp into the machine and into the slideways provided in the forging 11 and the puller housing 15.

As in the case of the tool shown in the above-mentioned U.S. Patent No. 2,312,400, the numeral 34 in the present drawings designates a punch head forged with a pair of rearwardly extending arms 35 that straddle the upper channeled portion of the forging 11 and are pivotally supported on the outer ends of the transverse pin 38. The punch head 34 overhangs the work receiving block 112 and is provided on its underside with a hardened steel pointed punch 37 which, when a hose clamp is being applied to a hose by the present machine, rests upon the top limb of the collar D of the clamp. After the clamp has been tightened, as hereinafter explained, the punch head 34 is utilized to lock the clamp in its tightened condition in the same manner explained in said U.S. Patent No. 2,312,400. That is, with the hose clamp in its tightened or tensioned condition, the punch head 34 is struck with a mallet or hammer to drive the punch 37 downwardly into the top of the collar D. This produces a series of offset lugs from the upper limb of the collar and the underlying coils of the clamp, the lugs being in internested relation with each other so that the clamp is locked against reexpansion or loosening of its coils.

Figure 6:
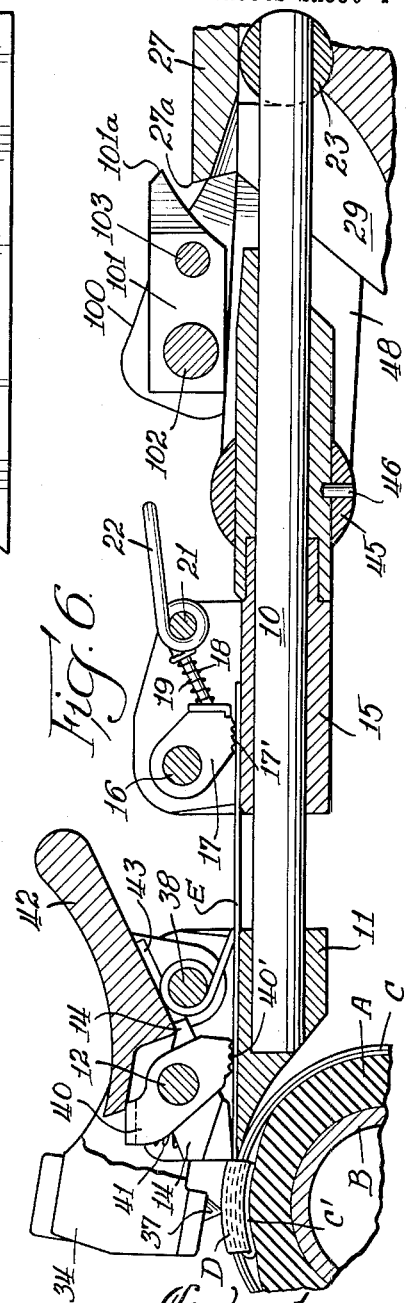
FIG. 6 is a view similar to FIG. 5, but showing the parts in the position which they occupy when the machine has completed a tensioning stroke in its cycle of operation and when the remaining parts are in the positions illustrated in FIG. 4.

A puller housing extension 15a is slidably mounted upon the rod 10 to the rear of the housing 15 and is permanently secured to the rear end of the housing 15, as by welding or the like, so that the housing 15 and its extension 15a slide as a single unit on the rod 10. A cylindrical shaped cross member 45 is received transversely on the housing extension 15a (FIGS. 5 and 7) and the two are fixedly secured together as by welding and by an orienting pin 46 (FIGS. 5 and 6). The opposite ends of this cross member 45 are provided with outwardly extending short stub shafts 47 which respectively pivotally receive the forward ends of a pair of links 48, the links being retained upon the stub shafts, for example, by means of washers 47a and pins 47b which extend through the stub shafts 47 (see FIGS. 7 and 8). The rear ends of the links 48 are offset outwardly, as seen in FIG. 7, and are respectively pivotally received upon outwardly projecting stub shafts 52 that are provided upon the upper ends of a pair of bell-crank members 50 which are disposed on opposite sides of the pivot block 24 and pivotally mounted upon the opposite ends of a fulcrum pin or bolt 51 that extends through the block 24.

Figure 4:
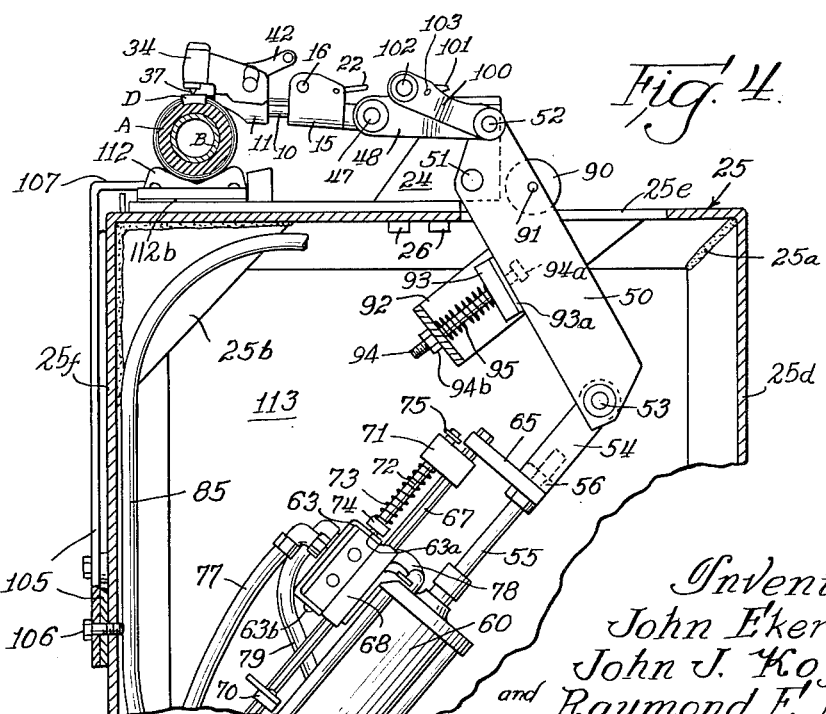
FIG. 4 is a fragmentary elevational view similar to FIG. 1 but illustrating the parts of the machine in a different operating position and at a different time during the operating cycle of the machine.

Referring now particularly to FIGS. 1 and 4 it will be observed that the bell-cranks 50 extend downwardly and diagonally rearwardly through an opening 25h provided in the upper frame member 25e. The lower ends of the bell-crank members are pivotally joined to the ends of a bifurcated clevis 54 by means of a clevis pin 53, the clevis being threaded upon the extremity of a piston rod 55 and locked in place by a locknut 56. The piston rod is attached to a piston (not shown) contained for reciprocating movement within a diagonally disposed cylinder 60 the lower end of which is pivotally mounted, by means of a pivot pin 62, between the legs of a U-shaped bracket 61 that is welded or bolted upon the inner side of the front frame member 25f. It will thus be appreciated that when the piston rod is reciprocated in and out of the cylinder 60 the bell-cranks 50 will be pivoted about the pin 51 to cause the links 48 to be driven forwardly and then rearwardly and thereby reciprocate the puller housing 15 and its extension 15a along the rod 10.

Attention is specifically called to the fact that the short stub shafts 52 on the upper ends of the bell-crank members 50 are located, generally speaking, in the area directly above the pivotal axis of the bell-crank members and substantially in the plane defined by the axis of the rod 10 and the axis of the stub shafts 47, and that the distance between the pivotal axis (the pin 51) and the pin 53 at lower ends of the bell-crank members is on the order of several times the distance between the pivotal axis 51 and the axis of the stub shafts 52. These structural features are of importance in the present machine. The fact that the distance between the pivot pin 51 and the clevis pin 53 is much greater than the distance between the pin 51 and the stub shafts 52 greatly increases the force applied to links 48 and thus to the puller housing 15, but that is not the extent of the advantage. Of equal importance is the fact that, because of the relatively short distance between the pivot pin 51 and the stub shafts 52 and because the stub shafts 52 are located at all times substantially in or very close to the plane defined by axes of the rod 10 and the stub shafts 47, the links 48 reciprocate through substantially straight line movement so that, despite the great forces that may be applied by the links to the puller housing 15 and its extension 15a, there is little lateral thrust applied to the rod 10. This permits the structure to perform heavy duties but yet permits the structure to be relatively light in weight and inexpensive to build.

The present machine is preferably operated by compressed air, and compressed air from any suitable source is led to an air pressure regulator 86 (FIGS. 2 and 3), of any suitable manufacture, preferably having a pressure adjustment control 86a (FIG. 3). Air pressure regulators are very well known in the art and no detailed description thereof is necessary here. For example, a standard filter regulator and lubricator unit such as that now manufactured by the Watts Regulator Company, Lawrence, Massachusetts, may be used as the regulator 86, but any other suitable regulator permitting the selection and maintenance of a predetermined air pressure may be used. Also, if desired, an air blast hose 86b (FIG. 2) may be provided in conjunction with the regulator 86 and provided with any suitable blow-gun nozzle (not shown) for keeping the machine and its working parts clean. Air at the predetermined pressure is led by an air hose 85 to the foot controlled valve 83a, which may be any suitable foot valve such, for example, as the valve of that type now being manufactured by the Versa Company, Brooklyn, New York.

From the foot valve 83a the air is led by a hose 77 to a micro air valve assembly 63 mounted by means of a bracket 64 upon the cylinder 60. This micro air valve assembly 63 may be of any suitable type for alternately directing the air into opposite ends of the cylinder so as to cause automatic reciprocation of the piston. Such a valve, for example, is the control valve disclosed in the U.S. patent to R. G. Olson, No. 2,729,242, and now manufactured by the Renco-Aire Division of Cleveland Pneumatic Industries, Inc., 2220 Palmer Ave., Kalamazoo, Michigan. The valve has operating buttons or stems 63a and 63b at its opposite ends which, when alternately depressed, will cause the air discharged from the valve to change from one outlet to another. One of these outlets in the present installation is connected by a hose 78 to the top of the air cylinder 60 and the other outlet is connected by a hose 79 through a one-way check valve 79a to the lower end of the cylinder, the lower end of the cylinder also being provided with a pressure relief valve 80 of any suitable conventional construction.

The base portion of the micro air valve 63 is provided with a guide housing 68 through which a control rod 67 extends for reciprocating movement, the upper end of the control rod being fixed to the upper end portion of the piston rod 55 by means of a bracket 65 which may be secured against the nut 56 by another nut 66. It will thus be understood that the control rod 67 will move with the piston rod. The lower end of the control rod is provided with a button or stem depressing member 70 for operating the control button or stem 63b of the micro valve 63. Adjacent the upper end of the control rod a bracket 71 is fixed thereon in any suitable manner, the bracket having a plunger 72 mounted therein for axial sliding movement. The upper end of the plunger has a snap ring 75, or the like, thereon to prevent the plunger from passing out of the bracket, and the lower end of the plunger has a head 74 thereon. A coil spring 73 is disposed about the body of the plunger 72, one end of the spring bearing against the bracket 71 and the other end bearing against the head 74 so that the plunger is spring biased downwardly as viewed in FIGS. 1 and 4.

From the foregoing description it will be understood that when the foot valve 83a is opened by pressure upon the pedal 83, the piston rod 55 will begin to reciprocate in and out of the cylinder 60 due to the controlling action of the micro valve 63. When the piston rod reaches the top of its stroke the member 70 on the lower end of the control rod will contact the control button 63b on the lower end of the valve 63. This will change the air pressure feed from the hose 79 to the hose 78 leading to the top of the cylinder so that the piston rod 55 will immediately begin a return stroke. As the piston rod makes its return stroke the lower end of the cylinder is vented through the relief valve 80 which is set to vent at a much lower pressure than the pressure being fed into the upper end of the cylinder. The predetermined pressure controlled by the regulator 86 may be set, for example, at from 40 to 70 pounds per square inch, in which case the relief valve 80, for reasons which will presently be explained, may be set to vent at, say, fifteen pounds per square inch. As the piston rod reaches the end of its return stroke the head 74 of the plunger 72 will contact the button 63a of the micro valve 63. This will immediately change the condition of the valve so that air under pressure will be fed through the hose 79 to the bottom of the cylinder to cause the piston rod again to extend, while at the same time the upper portion of the cylinder is vented through the hose 78 and through a vent opening in the valve 63. When the piston rod reaches its fully extended position, the member 70 will again strike the button 63b and the direction of movement of the piston rod will again change. In this way it will be understood reciprocation of the piston rod is automatically controlled by the valve 63 once the foot valve 83a is opened. Closing of the foot valve of course will cut off the supply of air and further action will cease.

It has previously been mentioned that the uppermost forward edge 27a of the cap plate 27 on the pivot block 24 provides a cutting and severing edge, so that the cap plate 27 serves as a stationary cutting or severing member. A pair of links 100 are pivotally mounted at one of their ends upon the stub shafts 52 on the bell-crank members 50 outside the links 48. The forward or free ends of the links 100 are joined or traversed by a heavy pin 102 which carries between the two links another severing block 101. Pivotation of the block 101 about the pin 102 is prevented by a second pin 103 which extends transversely between the two links 100 and through the block 101, the block 101 thus being fixed with respect to the links 100. The rear end of the block 101 is shaped to provide another cutting edge 101a adapted to cooperate with the cutting edge 27a of the cap plate 27 when it is desired to remove a hose clamp that has previously been applied to a hose A. Removal of such a hose clamp is accomplished when there is no hose resting on the work receiving V-block 112. When this condition exists, the operating parts at the top of the machine rest in the position illustrated in FIG. 8, wherein the forwardly extending rod 100 is dropped in a pivotal motion about the axis of the bearing member 23 so that the forging 11 on the forward end of the rod 10 comes to rest upon an upstanding rest member 25i which projects upwardly from the tool plate 25g, as shown in FIG. 8.

With the parts of the machine in the position shown in FIG. 8, the underside of the block 101 will rest on the upper edges of the links 48. Thus it will be appreciated that when the piston rod 55 is reciprocated to rock the bell-crank members about the pivot pin 51, the links 100, along with the links 48, will be moved in a reciprocating motion, thereby carrying the rearward edge 101a of the severing block 101, on alternate strokes, toward the severing edge 27a of the cap plate 27. Accordingly, when it is desired to remove a hose clamp that has previously been applied to a hose A, the hose and the clamp are positioned in the position illustrated in FIG. 8, wherein the collar D is disposed between the severing edges 101a and 27a. Thus, when the foot pedal 83 is depressed to open the foot controlled valve 83a to cause reciprocation of the piston rod 55, the outer transverse link of the collar D will be pinched between the severing edges 101a and 27a, thereby severing this limb of the collar and breaking the retaining means of the hose clamp, whereupon the hose clamp may be readily stripped from the hose.

When a hose clamp is being applied to a hose A, however, the links 100 with their severing block 101 therebetween may be pivoted rearwardly about the stub shafts 52 to the broken line or phantom position illustrated in FIG. 1, wherein the upper side of the block 101 will rest on a cylindrical bumper member 90, of rubber or the like, mounted between the bell-crank members 50 upon a pin 91 that extends between the two bell-crank members. In this pivoted position the links 100 and the cutting block 101 will be in a retracted position where they will in no way interfere with the operation of the machine when the machine is being used to apply a hose clamp in the manner about to be described.

Before proceeding with a description of the operation of the machine during the application of a hose clamp to a hose A, it may be pointed out that the present machine is provided with a snubber arrangement that coacts with the two bell-crank members 50 when the piston rod 55 approaches or reaches its downward or retracted position. This snubber arrangement is best seen in FIGS. 1 and 4 and comprises a U-shaped frame 92 that is welded or otherwise secured between the downwardly extending side flanges of the upper frame member 25e. As illustrated, the two legs of this frame member 92 extend diagonally downwardly on opposite sides of the two bell-crank members 50. The transverse web of the U-shaped frame member 92 is provided with an opening through which there slidably extends a pin 94 having a head 94a on one end and a nut 94b on its other end. The pin 94 is encompassed by a coil compression spring 95, one end of which bears against the transverse web of the frame 92 and the other end of which bears against the underside of an absorber block 93 that is slidably mounted upon the pin 94, the upper face of the block 93 being provided, if desired, with a facing 93a of nylon or the like. From FIG. 4 it will be observed that as the piston rod 55 reaches its extreme retracted position, wherein the head 74 of the pin 72 comes into contact with the control button 63a of the micro air valve 63, the under edges of the two bell-crank members 50 likewise will have come into contact with the upper surface of the absorber block 93, thereby causing the snubbing spring 95 to be compressed. This snubber arrangement serves to protect the machine from damage at the end of the last step in the application of a hose clamp to a hose A, as will be more fully explained below.

If desired, the machine of the present invention may be provided adjacent its upper end on one of its sides with a bracket 25j (FIG. 3) for holding a mallet or the like which may be used in striking the punch head 34 to lock a hose clamp when the hose clamp has been tensioned by the machine about a hose A. The machine may also be provided with a cover 110 that may be mounted upon the other side of the machine by means of one or more hinges 111. This cover, for simplicity of illustration, has been shown only in FIG. 3, and from this figure it will be observed that when the cover is in its closed position the cover will enclose the upper portion of the machine. On the other hand, when the cover is in its open position, as shown by the full lines in FIG. 3, the cover may serve as a convenient hopper for a ready supply of hose clamps or other parts.

When an operator desires to apply a hose clamp by means of the present machine the operator should first check to insure that the air pressure regulator 86 is properly set to provide air at the proper predetermined pressure. This predetermined pressure, as previously mentioned, may be controlled in the usual manner by the regulator valve 86a. The operator then slips a hose clamp into the machine. This will require lifting the forward end of the apparatus upward off of the rest 25i and placing the hose clamp upon the work receiving V-block 112. At the time the hose clamp is so positioned, the "tailpiece" or extension E of the clamp is fed into the machine—that is, into the slideways provided in the forging 11 and the puller housing 15. Insertion of the extension E of the hose clamp into the machine is facilitated by raising the nose piece 14 and the yoke-shaped holding dog 40. This is accomplished by raising the lever 42, thereby causing the extremity 42b of the lever to bear downwardly upon the top of the holding dog 40 and causing the lug 42c on the under side of the lever to bear downwardly upon the tail end of the pusher nose 14. This movement of the lever 42 raises the forward portion of the pusher nose 14 and simultaneously raises the teeth 40' of the holding dog 40, thereby permitting the "tailpiece" or extension E of the clamp readily to be slid into the slideways of the forging 11 and the puller housing 15. At the same time, the extremity of the extension E of the clamp will pass rearwardly under the pulling dog 17, automatically raising the dog 17 to admit the extension E thereunder. The extension E of the clamp is pushed longitudinally through the slideways of the forging 11 and the puller housing 15 until the clamp is brought to the position shown in FIG. 5, whereupon the lever 42 is released to cause the dog 40 and the pusher nose 14 to return to their normal positions wherein the teeth 40' of the dog 40 will be in contact with the upper surface of the extension E of the clamp and the forward end of the pusher nose 14 will abut one side of the upper transverse limb of the collar D. The compression of the cam spring 19 in the puller housing 15 will, of course, cause the teeth 17' of the pulling dog 17 likewise to bear against the upper surface of the inner end portion of the extension E of the hose clamp. When the hose clamp has been positioned in the machine, the operator may then place a nipple B in the end of a hose A, and the hose end is then placed in the clamp.

Having positioned the hose and the hose clamp as described above, the operator is then ready to cause the machine to tension the coils C of the clamp about the hose A. In order to do this the operator simply depresses the foot pedal 83 to open the valve 83a. This admits air at the predetermined pressure to the micro air valve 63 which causes the piston 55 to begin its reciprocating motion. On its downward or retracting stroke the piston rod 55 will pivot the bell-crank members 50 about the pivot pin 51 and thereby cause the links 48 to be pulled to the right as viewed in FIG. 1. This will cause the puller extension 15a and the puller housing 15 to slide longitudinally to the right on the rod 10. Thus, on the retracting stroke of the piston rod 55, the puller housing 15 and its extension 15a will be moved from the position thereof shown in FIG. 5 to the position shown in FIG. 6. During this movement the teeth 17' of the puller dog 17 will dig into the upper surface of the extension E of the clamp, and will pull the extension to the right to tighten the coils C about the hose A. When or shortly before the piston rod 55 reaches its retracted position shown in FIG. 4, the head 74 of the pin 72 will contact the control button 63a of the micro air valve 63 to cause the direction of movement of the piston rod to be reversed. This will initiate the reverse or extending movement of the piston rod which will pivot the bell-crank members in the counterclockwise direction to cause the pulling housing 15 and its extension 15a to return to their original position shown in FIG. 5. During this returning movement of the puller housing 15 the holding dog 40 holds the extension E of the clamp in position so as to retain in the coils C the tension that has been produced by the first tightening or pulling stroke of the machine. The pulling dog 17, on the other hand, will slide along the top of the extension E of the clamp during this returning movement. When the piston rod 55 next reaches the outer limits of its extending movement the control member 70 on the control rod 67 will contact the control button 63b of the micro air valve 63, again to reverse the direction of movement of the piston rod and thus initiate another pulling stroke.

The reciprocation of the piston rod 55 continues to produce a plurality of relatively short pulling strokes of the puller housing 15, with the intervening return strokes, until the force produced by the air in the cylinder 60 upon the piston therein and exerted through the leverage provided by the bell-cranks 50 is equal to the tension produced in the coils C of the hose clamp at which time the machine will, in effect, stall. Thus, the total tension produced in the coils C will be determined by the predetermined pressure of the air set up by adjustment of the pressure regulator 86.

When the machine stalls, as just described, the hose clamp will have been tightened to the desired degree about the hose A. With the machine still in its stalled condition the operator strikes the punch head 34 sharply with a mallet or the like, thereby driving the punch 37 downwardly into the collar D and causing dimples to be offset in internested fashion in the outer limb of the collar and in the lapped coils within the collar. This securely locks the coils C of the clamp in their tensioned condition about the hose A.

After the punch head 34 has been struck to lock the hose clamp in its tensioned condition as just described, the extension E of the hose clamp is broken from the clamp at the right-hand edge of the collar D as viewed in FIGS. 5 and 6. This is accomplished by grasping the hose by the hands and flexing or rotating the clamp back and forth with respect to the extension E which remains firmly gripped and under tension in the machine. The flexing of the hose and the clamp back and forth with respect to the extension E will cause the extension to break at the forward end of the pusher nose 14 and at the edge of the collar D.

Inasmuch as the machine remains in its stalled condition at the time the extension E is broken from the hose clamp, it will be appreciated that the air pressure in the upper end of the cylinder 60 holding the extension E under tension will cause the piston rod 55 to be retracted downwardly rather violently at the instant the extension E of the hose clamp is broken. Damage to the machine, however, is avoided when this takes place by virtue of the pressure relief valve 80 that is connected to the lower end of the cylinder 60, by the snubber mechanism 93, 94, and by the sliding mount of the valve control pin 72. Due to the fact that the one-way check valve 79a is employed in the air conduit leading to the lower end of the cylinder 60 and due to the use of the pressure relief valve 80, it will be understood that a cushion of air will at all times remain in the lower end of the cylinder 60. Thus, when the extension E of the hose clamp is broken, the downward thrust of the piston rod 55 caused by the air pressure in the upper end of the cylinder will cause the piston within the cylinder to impinge upon the remaining air in the lower end of the cylinder, thereby cushioning the shock of the quick retracting movement of the piston rod 55. At the same time, the lower edges of the bell-crank members 50 will strike the snubber or absorber block 93 to depress the spring 95 and thereby cause the spring to absorb the remaining portion of the downward force of the piston rod 55 and the bell-crank members 50. Damage to the micro air valve 63 is avoided inasmuch as the pin 72 will slide upwardly with respect to its bracket 71 when the head 74 of the pin strikes the control button 63a of the micro switch and when any downward overtravel of the piston and piston rod 55 is experienced. Because of these several factors, the extension E of the hose clamp may be broken while the machine is stalled, and while the extension is in a high state of tension, without causing any damage to the machine despite the relatively light construction of the machine.

During the application of the hose clamp to the hose A, and during the breaking of the hose clamp extension E from the remainder of the clamp, the operator will keep his foot on the foot pedal 83. After the extension E has been broken from the hose clamp, the operator may keep his foot on the foot pedal until the machine has completed two or three additional operating strokes, during which the broken extension E will be fed rearwardly through the slideways of the forging 11 and the puller housing 15 to a position from which the extension E may readily be removed from the machine. The operator may then release his foot from the foot pedal 83 to discontinue the admission of air to the micro air valve 63.

It will be understood from the foregoing description that the lower end of the cylinder 60 is vented solely through the relief valve 80 which, for example, may be set to relieve all air pressures from the lower end of the cylinder in excess of, say, 15 pounds. Unlike the upper end of the cylinder 60, no air from the lower end of the cylinder is exhausted through the micro valve 63 in view of the one-way check valve 79 that is employed in the air conduit to the lower end of the cylinder. Thus, regardless of the precise operating position of the machine at the time the operator moves his foot from the foot pedal 83, the residue of air contained in the lower end of the cylinder, which as just indicated may be 15 pounds per square inch for example, will tend always to cause the parts of the machine to return to the position illustrated in FIG. 1.

It will, of course, be appreciated that the use of the pressure relief valve 80 at the lower end of the cylinder 60 does not in any way interfere with or prevent the return strokes made by the apparatus between each of the power or band pulling strokes thereof. During the operation of the machine, the return strokes require very little power so that the piston within the cylinder 60 is raised very quickly to cause the full extending or returning stroke of the piston rod 55 to be completed before the air pressure in the bottom of the cylinder has an opportunity to build up to or exceed the pressure at which the relief valve 80 is set. During the power stroke of the machine—that is, during the downward stroke of the piston rod 55, the pressure of the air in the upper end of the piston will be substantially equal to the predetermined pressure at which the pressure regulator 86 is set. This pressure, which as stated earlier herein may be from 40 to 70 pounds per square inch for example, will be much greater than the pressure existing in the lower end of the cylinder, so that the pressure in the upper end of the cylinder will readily overcome the pressure in the lower end thereof and will cause the piston and its piston rod 55 to make its power stroke. During this power stroke the relief valve 80 vents the air from the lower end of the piston so as to prevent a build-up of pressure in the lower end.

Due to the pivotal mounting of the rod 10 at the top of the machine, it will be appreciated that the present machine is adapted for applying hose clamps to hoses having a relatively wide range of diameters. The outer end of the rod 10, and the forging 11 thereon and its related parts, will of course occupy a more elevated position when a clamp is being applied to a large hose than the position that will be occupied when a clamp is being applied to a smaller hose. These particular parts, therefore, are essentially self-adjusting so as to handle a hose and hose clamp of any reasonable size. The work receiving V-block 112 which is free to slide forwardly or rearwardly, in effect floats and finds its own correct position depending upon the size of the hose and the hose clamp being acted upon.

It has been pointed out earlier herein that the longer legs of the bell-crank members 50 are several times the length of the short legs thereof, thereby increasing the force applied to the puller housing 15, and that the stub shafts 52 to which the links 48 are pivotally secured are located at all times, during the operation of the machine, closely adjacent the plane of reciprocation of the puller housing 15 and its extension 15a. The position of the axis of these stub shafts 52 of course constantly changes during the operation of the machine, but this position never departs substantially from the general plane of reciprocation of the puller housing 15, this plane being considered to be a horizontal plane passed through the longitudinal axis of the rod 10. Thus, although very high pulling forces may be exerted by the bell-cranks 50 and the links 48 upon the puller housing and its extension 15a, the lateral or vertical component of these forces will at all times remain very small. This greatly reduces the wear upon the rod 10 and permits the parts of the machine to be much lighter in construction than would otherwise be the case. It will also be observed that the two bell-crank members 50 and the two links 48 are disposed symmetrically on opposite sides of a vertical plane passed through the longitudinal axis of the rod 10. This arrangement likewise avoids the application of lateral thrusts to the rod 10. The links 100 of the cutter mechanism similarly are disposed on opposite sides of this vertical plane so that during the severing of a hose clamp from a hose, as illustrated in FIG. 7, there is no tendency to twist the parts or distort the bell-cranks 50.

The manner in which the outer or transverse limb of a collar D of a hose clamp is severed has previously been described herein with reference to FIG. 7. The operation of the cylinder 60 and the related parts of the machine in order to accomplish this severing action is, of course, the same as that described above with respect to the operation of the machine during the application of a hose clamp.

In connection with the hose clamp severing or clipping mechanism, it may be pointed out that in actual practice the arms 100 and the severing block 101 are normally pivoted to their inactive position (illustrated by the broken lines in FIG. 1) at all times when a hose clamp is actually being tensioned about a hose. Thus, it will be understood that in FIGS. 1, 4, 5 and 6, wherein a hose clamp is shown being tensioned or about to be tensioned, the arms 100 and the severing block 101 are shown in their active positions only for purposes of better illustration of the mechanism.

The foregoing description of a preferred embodiment of the present invention has been given for clearness of understanding only and no unnecessary limitations should be implied therefrom, for it will readily be appreciated by those skilled in the art that numerous variations and modifications may be made in the embodiment or embodiments of the invention without departing from the spirit and scope of the appended claims.

We claim:

1. A power operated hose clamp applying machine for producing a predetermined tension in the metal band of a hose clamp, comprising a straight rod, band pulling means mounted for sliding reciprocation on said rod and adapted to engage the band, a fluid operated reciprocating motor having a cylinder and piston, means for supplying driving fluid to said motor at a predetermined pressure, drive transmission means interconnecting said motor and said band pulling means for driving said band pulling means in reciprocating motion through a succession of alternating band pulling and return strokes, means for retaining said band during each of said return strokes so that the tension in said band will be increased upon each band pulling stroke of said band pulling means, said motor having a piston area such that the maximum force applicable to said band pulling means by said transmission means and said motor at said predetermined pressure is equal to the desired band tension, whereby said desired band tension will be obtained by operating said motor until it stalls, said drive transmission means including a pair of pivoted bell-cranks disposed on opposite sides of a plane passed through the longitudinal axis of said rod, each of said bell-cranks having a long leg operatively connected to said motor and a short leg pivotally connected to one of a pair of links respectively operatively interposed between said short legs and said band pulling means, the pivotal connections between said links and said short legs of said bell-cranks being disposed at all times adjacent a second plane passed through said longitudinal axis of said rod and normal to said first mentioned plane, so as to minimize the lateral thrust applied to said band pulling means.

2. The combination set forth in claim 1, wherein said bell-cranks and said links are respectively concentrically disposed on opposite sides of said first mentioned plane.

References Cited in the file of this patent

UNITED STATES PATENTS

| | | |
|---|---|---|
| 708,332 | Ennor | Sept. 2, 1902 |
| 2,100,601 | Harvey | Nov. 20, 1937 |
| 2,312,400 | Govanus | Mar. 2, 1943 |
| 2,426,095 | Hecker | Aug. 19, 1947 |
| 2,436,806 | Hund | Mar. 2, 1948 |
| 2,597,675 | Sackett | May 20, 1952 |
| 2,649,154 | Adrian | Aug. 18, 1953 |
| 2,729,994 | Hewitt et al. | Jan. 10, 1956 |
| 2,754,117 | Ghormley | July 10, 1956 |
| 2,796,783 | Daniels | June 25, 1957 |
| 2,825,405 | Maass et al. | Mar. 4, 1958 |
| 2,837,949 | Lodholm | June 10, 1958 |
| 2,864,582 | Hall | Dec. 16, 1958 |
| 2,882,934 | Gerrard | Apr. 21, 1959 |